United States Patent
Oppenheimer

(10) Patent No.: US 8,850,318 B2
(45) Date of Patent: Sep. 30, 2014

(54) APPARATUS AND METHOD FOR LOW BANDWIDTH PLAY POSITION PREVIEWING OF VIDEO CONTENT

(75) Inventor: Charles Oppenheimer, Menlo Park, CA (US)

(73) Assignee: Digital Fountain, Inc., San Diego, CA (US)

( * ) Notice: Subject to any disclaimer, the term of this patent is extended or adjusted under 35 U.S.C. 154(b) by 327 days.

(21) Appl. No.: 11/738,778

(22) Filed: Apr. 23, 2007

(65) Prior Publication Data

US 2008/0263448 A1    Oct. 23, 2008

(51) Int. Cl.
    *G06F 3/00*    (2006.01)

(52) U.S. Cl.
    USPC ........................................ 715/719

(58) Field of Classification Search
    CPC ................................. H04N 21/6587
    USPC ......... 715/719, 711, 838, 716–731, 705–726, 715/730–732
    See application file for complete search history.

(56) References Cited

U.S. PATENT DOCUMENTS

| | | | | |
|---|---|---|---|---|
| 5,732,184 | A * | 3/1998 | Chao et al. ............. | 386/282 |
| 5,828,370 | A * | 10/1998 | Moeller et al. .......... | 715/720 |
| 7,185,283 | B1 * | 2/2007 | Takahashi ............... | 715/723 |
| 7,434,245 | B1 * | 10/2008 | Shiga et al. ............. | 725/43 |
| 2002/0012526 | A1 | 1/2002 | Sai et al. | |
| 2002/0021758 | A1 * | 2/2002 | Chui ..................... | 375/240.19 |
| 2002/0048043 | A1 | 4/2002 | Takahashi et al. | |
| 2004/0086264 | A1 | 5/2004 | Okada et al. | |
| 2004/0225635 | A1 * | 11/2004 | Toyama et al. ........... | 707/1 |
| 2005/0010955 | A1 | 1/2005 | Elia et al. | |
| 2005/0069283 | A1 * | 3/2005 | Mitsuyu ................. | 386/46 |
| 2006/0064716 | A1 * | 3/2006 | Sull et al. .............. | 725/37 |
| 2006/0080306 | A1 * | 4/2006 | Land et al. ............. | 707/3 |
| 2006/0239646 | A1 | 10/2006 | Kang | |
| 2007/0157265 | A1 * | 7/2007 | Maekawa ................ | 725/88 |
| 2007/0258655 | A1 * | 11/2007 | Motominami ............ | 382/254 |
| 2007/0260677 | A1 * | 11/2007 | DeMarco et al. ......... | 709/203 |
| 2008/0256449 | A1 * | 10/2008 | Bhatt ................... | 715/720 |

FOREIGN PATENT DOCUMENTS

| | | |
|---|---|---|
| EP | 1024444 A2 | 8/2000 |
| EP | 1513151 A1 | 3/2005 |
| EP | 1758383 A2 | 2/2007 |
| JP | H11127420 A | 5/1999 |
| JP | 2000514264 T | 10/2000 |
| JP | 2002112158 A | 4/2002 |
| JP | 2002259259 A | 9/2002 |
| JP | 2005101994 A | 4/2005 |
| JP | 2005267279 A | 9/2005 |

(Continued)

OTHER PUBLICATIONS

International Search Report, PCT/US2008/060363—International Search Authority—US, Aug. 1, 2008.

(Continued)

*Primary Examiner* — Enrique Iturralde

(57) ABSTRACT

A computer readable storage medium includes executable instructions to display video content. A cursor associated with the relative position of the video content is provided. A new cursor position associated with a request for a new relative position of the video content is received. A thumbnail image of the video content corresponding to the new relative position is displayed. The thumbnail image is then transitioned to a full display image.

14 Claims, 4 Drawing Sheets

(56) References Cited

FOREIGN PATENT DOCUMENTS

| JP | 2005277847 A | 10/2005 |
| JP | 2006174309 A | 6/2006 |
| JP | 2006319551 A | 11/2006 |
| JP | 2007006025 A | 1/2007 |
| KR | 100487684 B1 | 9/2005 |
| WO | WO9800973 A1 | 1/1998 |
| WO | WO2005101408 A1 | 10/2005 |

OTHER PUBLICATIONS

Supplementary European Search Report—EP08745878, Search Authority—The Hague Patent Office, May 12, 2010.
Written Opinion—PCT/US2008/060363, International Search Authority, European Patent Office, Jan. 8, 2008.

* cited by examiner

APPARATUS AND METHOD FOR LOW BANDWIDTH PLAY POSITION PREVIEWING OF VIDEO CONTENT

BRIEF DESCRIPTION OF THE INVENTION

This invention relates generally to the delivery and display of video content. More particularly, this invention relates to a low bandwidth play position preview technique for video content.

BACKGROUND OF THE INVENTION

Fast forward and rewind functions (often called "trick play" features) associated with network-based video-on-demand systems need to provide visual feedback to assist users in locating the desired play position. Some systems provide only time-based reference feedback, which requires the user to know the relative location of the desired playback point. Examples of such systems include video streaming software applications where a slider control allows the user to reposition the playback point at some relative point in time. These controls are frustrating to use because they typically require multiple trial-and-error attempts to identify the desired location.

Other systems provide feedback in the form of a rendering of the video at accelerated speed (in either direction), requiring the user to quickly press the "play", "stop" or "pause" buttons when the desired playback point is seen. Such systems often result in over-shoot or under-shoot because of slow user reaction time and latencies between user input and the delayed reaction of the network VOD system. These systems are also frustrating to use because even when moving at accelerated speed, it can take a long time to reach the desired position if it is a long distance from the current playback position.

Professional and consumer video editing systems have long provided direct visual selection of video content positioning with frame-level accuracy either via computer software or jog-and-shuttle controls. However, to provide such capabilities via networked VOD systems would require expensive, low-latency high-bandwidth networks and server systems.

In view of the foregoing it would be desirable to provide an inexpensive and easy-to-use mechanism for play position previewing of video content.

SUMMARY OF THE INVENTION

The invention includes a computer readable storage medium with executable instructions to display video content. A cursor associated with the relative position of the video content is provided. A new cursor position associated with a request for a new relative position of the video content is received. A thumbnail image of the video content corresponding to the new relative position is displayed. The thumbnail image is then transitioned to a full display image.

The invention also includes a method of delivering video content. A request for video content is received. Thumbnail images associated with the video content are located. The thumbnail images and video content are delivered to facilitate the use of the thumbnail images to locate desired content within the video content. The video content is then displayed. A cursor associated with the relative position of the video content is provided. A new cursor position associated with a request for a new relative position of the video content is received. A thumbnail image of the thumbnail images that corresponds to the new relative position is displayed. The thumbnail image is then transitioned to a full display image.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
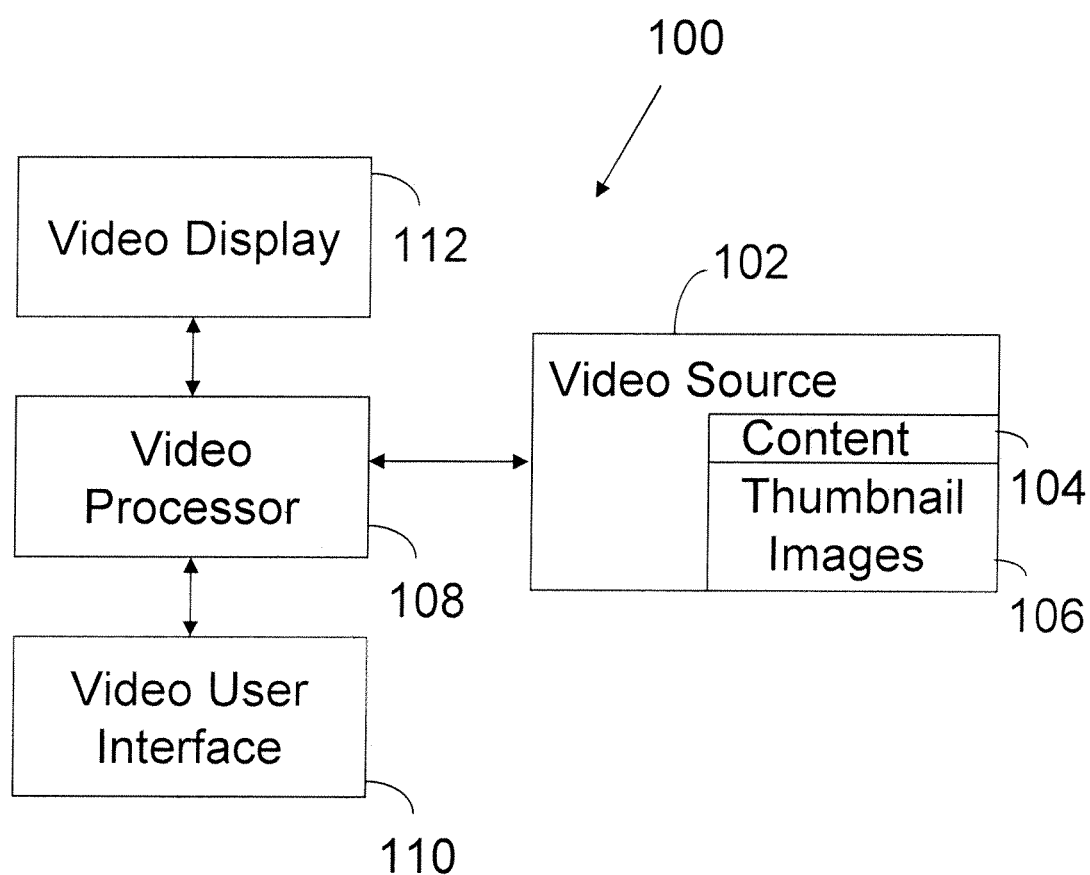
FIG. 1 illustrates a system configured in accordance with an embodiment of the invention.

FIG. 1 illustrates a system 100 configured in accordance with an embodiment of the invention. The system 100 includes a video source 102, which stores full-resolution video content 104 and associated thumbnail images 106. The thumbnail images 106 have time index values associated with the video content. The video source is typically a video on demand (VOD) server, such as an Internet server or a cable network server. Alternately, the video source may be a consumer device, such as a digital video disc player or a compact disc player.

The system 100 also includes a video processor 108. The video processor 108 may include an associated memory to store the content 104 and thumbnail images 106. Alternately, the video processor 108 may be configured to directly utilize the content 104 and thumbnail images 106 at the video source 102. The video processor 108 may be configured to execute software (i.e., executable instructions) to implement operations of the invention. Alternately, the video processor 108 may be hardwired to implement operations of the invention. The video processor 108 may be implemented as a general purpose computer, a personal digital assistant, a mobile telephone, a set-top box, and the like.

A video user interface 110 is linked to the video processor 108. The video user interface 110 may be in any number of forms, including a keyboard, mouse, remote control, and the like. A video display 112 is also linked to the video processor 108. The video display is any display configured to present video content, such a computer display, television, mobile telephone display, and the like.

Figure 2:
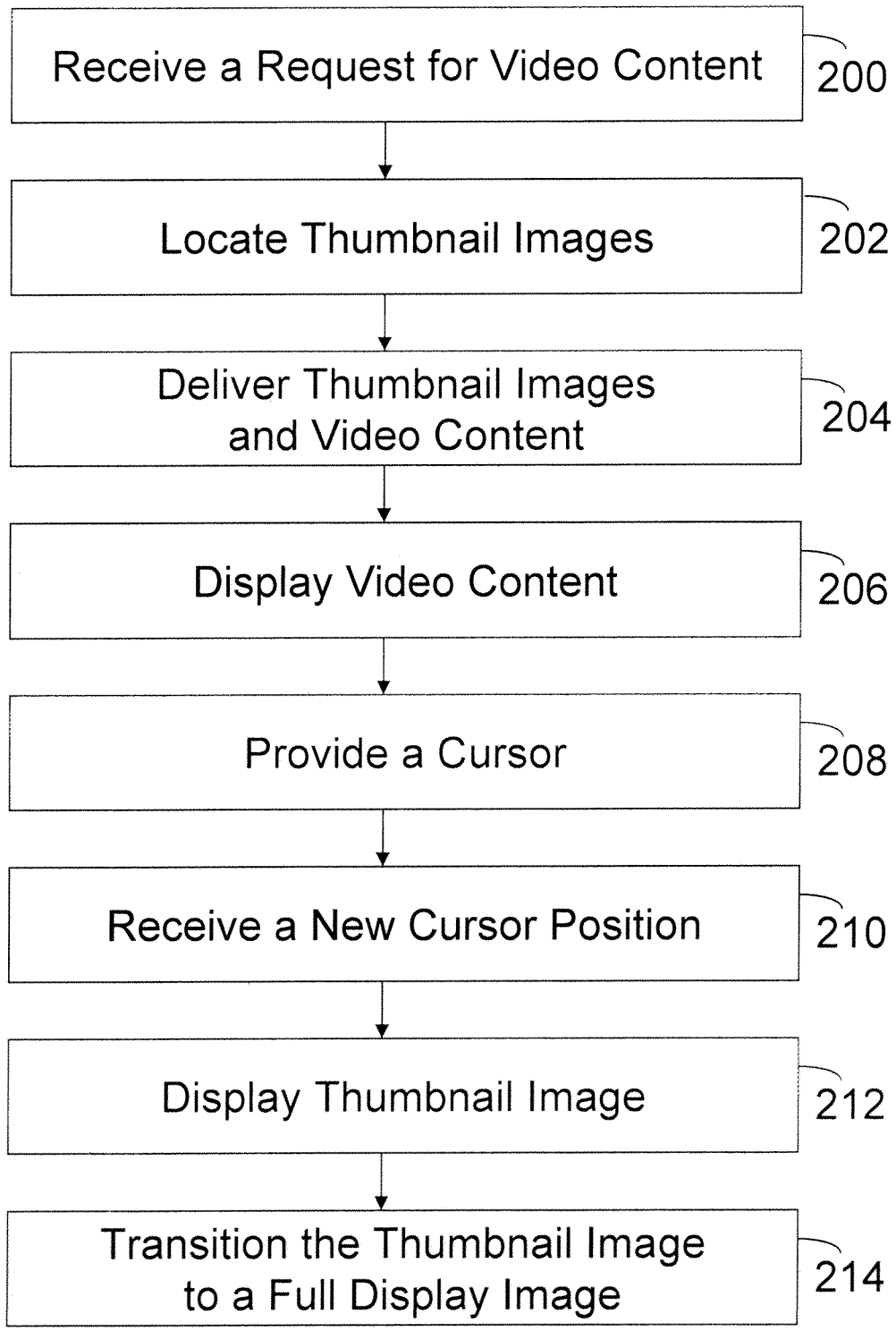
FIG. 2 illustrates processing operations associated with an embodiment of the invention.

FIG. 2 illustrates processing operations associated with an embodiment of the invention. A request for video content is received 200. Thus, for example, the video processor 108 may generate a request that is received by the video source 102. Thumbnail images associated with the request are then located 202. The thumbnail images may be generated dynamically or they may be preexisting. In either event, the thumbnail image is in comparison to the video content 104, a relatively low resolution image of time indexed video. As its name implies, the thumbnail image is relatively small. Thus, there is reduced bandwidth associated with the transport and processing of the thumbnail image.

The thumbnail images and video content are then delivered 204. For example, the thumbnail images and video content are sent from the video source 102 to the video processor 108. The delivery mechanism may be via the Internet, a cable broadcast system, a wireless link or a hardwired link. The thumbnail images may be conveyed first, followed by the video content, in parallel with the video content or after the video content.

Figure 3:
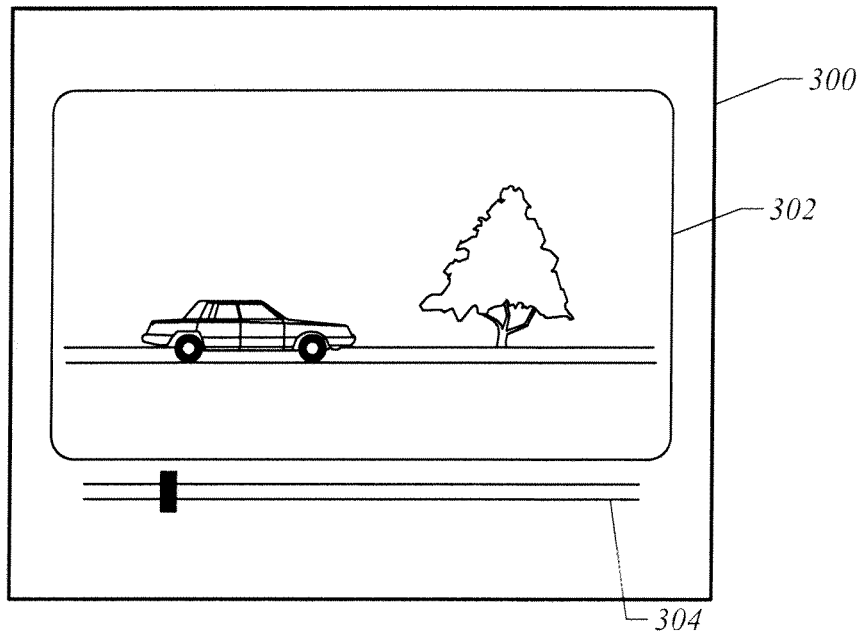
FIG. 3 illustrates a video display with a cursor associated with an embodiment of the invention.

The video content is then displayed 206. For example, the video processor 108 may display the content on the video display 112. FIG. 3 illustrates a video display 300 with content 302. A cursor is provided 208. FIG. 3 illustrates a cursor (e.g., a time relative slider) 304 associated with the content 302. The cursor provides an indication of the relative position of the displayed content with respect to the entire content.

Figure 4:
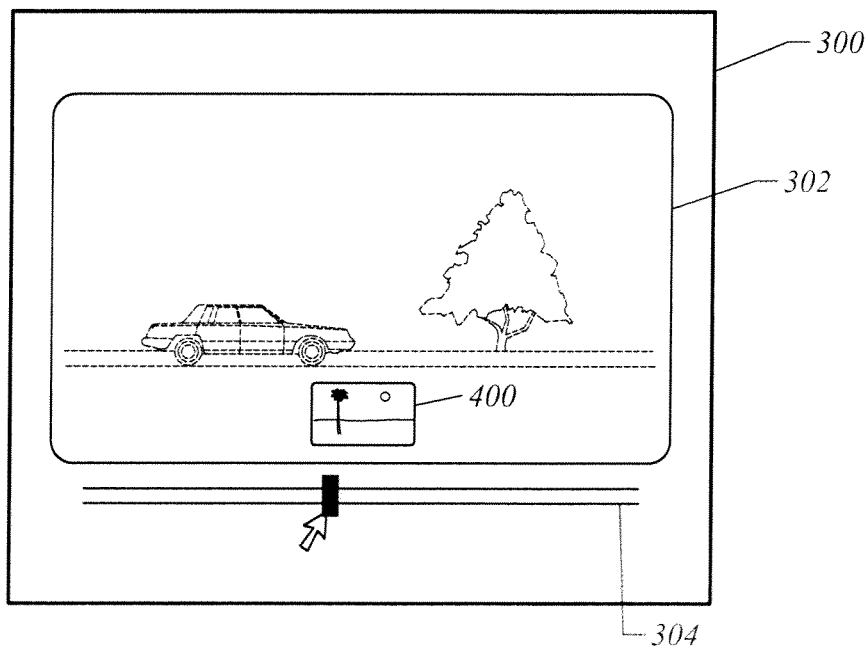
FIG. 4 illustrates a video display and thumbnail image utilized in accordance with an embodiment of the invention.

A new cursor position is then received 210. FIG. 4 illustrates a repositioning of the cursor 304 using any number of known techniques. In response to the new position, a thumbnail image is displayed 212. The thumbnail image corresponds to the time indexed position of the manipulated cursor.

FIG. 4 illustrates a thumbnail image 400 corresponding to the new relative position of the cursor. The display of the thumbnail image 400 may be accompanied by a reduction in the displayed resolution of the video content, as shown with the dashed lines of FIG. 4. The reduction in the resolution of the displayed video content may be accompanied by visual emphasis of the thumbnail image 400, such as by displaying it with higher relative color resolution, brightness or contrast relative to the video content or by surrounding it with a bright border. Manipulation of the cursor may cause a pause in the play of the video. Thus, the originally displayed content is in a pause mode and perhaps displayed with diminished resolution. Such an approach advantageously reduces traffic in network and cable embodiments of the invention.

Figure 5:
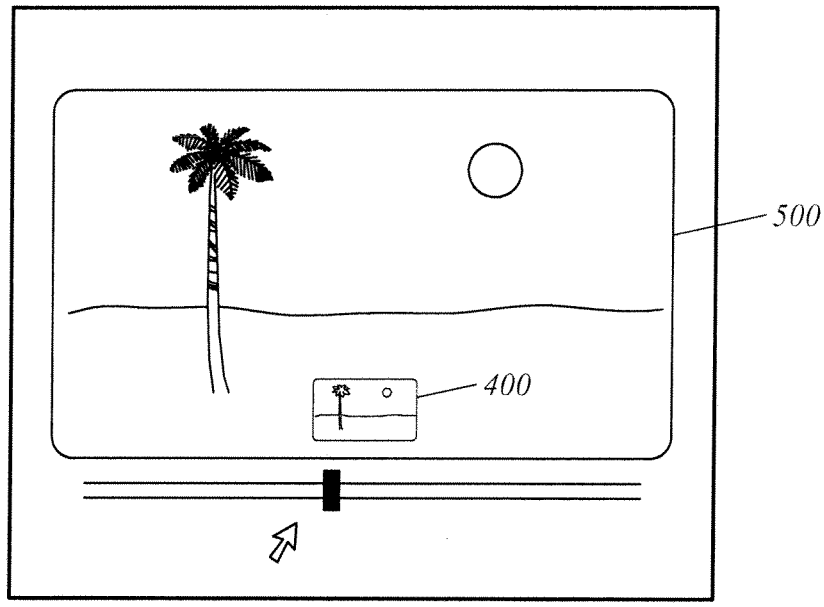
FIG. 5 illustrates a video display with a thumbnail transition to full display in accordance with an embodiment of the invention.
Figure 6:
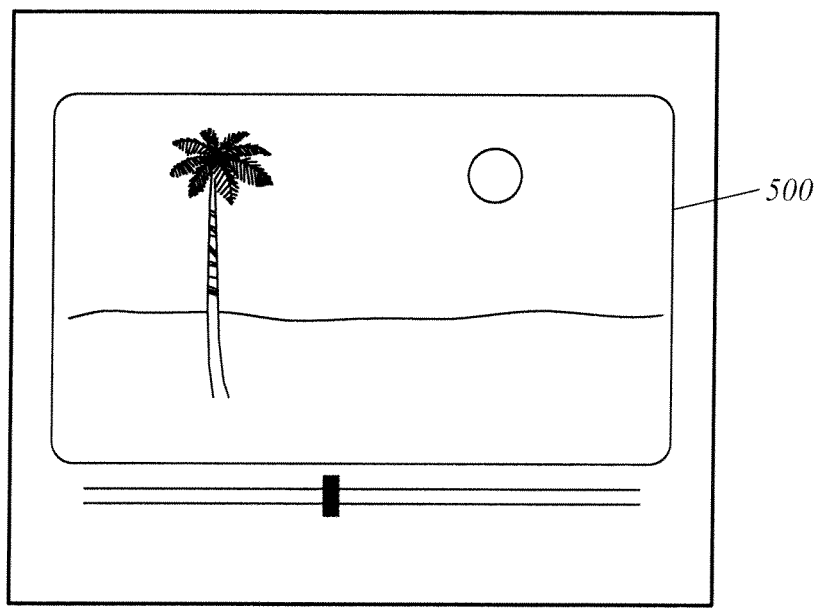
FIG. 6 illustrates a video display with a thumbnail fade in accordance with an embodiment of the invention.

The thumbnail image is then transitioned to the corresponding full resolution display image 214. FIG. 5 illustrates a full resolution display image 500 of the thumbnail image 400. The display of the full resolution image is typically accompanied by the fading and elimination of the thumbnail image, as shown in FIG. 6. Play of the video is resumed at the new relative position of the cursor.

In one implementation of the invention, as the video begins playing, the thumbnail frames are quickly downloaded as a small file so that there is no need to perform real-time fetching of thumbnail frames from the network as the cursor is moved. This allows fast responsiveness, while minimizing real-time bandwidth and server requirements. In a variation on this approach, a small number of broadly-time-spaced thumbnail frames are quickly downloaded as the video starts playing and then additional thumbnails representing increasing time-resolution detail are downloaded as the video continues to play. In another variation, the thumbnails, are fetched from a network as individual small images and presented in real-time as the cursor is moved.

Variations of the user-interface portion of the invention include alternative de-emphasis presentations of the main or full resolution video image, alternative appearance and emphasis of the thumbnail selection rendering and alternative controls that perform similar utility as the slide cursor.

Thus, the invention provides an efficient mechanism to locate desired video content. Moreover, the mechanism is relatively low bandwidth since in relies upon thumbnail images for navigation, not the entire video content.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed: obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:
   by a remote server, receiving, from a video processor device, a request for video content;
   by the remote server, obtaining reduced-resolution thumbnail images corresponding to relative time positions of the requested video content; and
   by the remote server, delivering the thumbnail images and also the requested video content to the video processor device to facilitate the video processor device's use of the thumbnail images to locate desired content within the requested video content,
   wherein the remote server delivers, to the video processor device, the thumbnail images independently of the requested video content, and
   wherein, when the remote server delivers the thumbnail images to the video processor device, the remote server first delivers broadly-time-spaced thumbnail images to the video processor device, and after delivering the broadly-time-spaced thumbnail images to the video processor device, the remote server then delivers additional thumbnail images representing increasing time-resolution detail to the video processor device.

2. The method of claim 1 further comprising:
   playing the video content;
   providing a cursor associated with a relative time position of the video content;
   receiving a new cursor position associated with a request for a new relative time position of the video content;

in response to receiving the new cursor position, displaying a thumbnail image that corresponds to the new relative time position; and transitioning the thumbnail image to a full display image at the new relative time position.

3. The method of claim 2 further comprising resuming play of the video content from the new relative time position.

4. The method of claim 2 further comprising pausing the video content in response to the request for a new relative time position to form paused video content.

5. The method of claim 4 further comprising displaying the paused video content in a reduced resolution format.

6. The method of claim 5 further comprising visually emphasizing the thumbnail image using a higher brightness relative to the paused video content.

7. A system comprising:

a remote server device configured to:

receive, from a video processor device, a request for video content;

obtain reduced-resolution thumbnail images corresponding to relative time positions of the requested video content; and deliver the thumbnail images and also the requested video content to the video processor device to facilitate the video processor device's use of the thumbnail images to locate desired content within the requested video content, wherein the remote server device delivers, to the video processor device, the thumbnail images independently of the requested video content, and wherein, when the remote server device delivers the thumbnail images to the video processor device, the remote server device first delivers broadly-time-spaced thumbnail images to the video processor device, and after delivering the broadly-time-spaced thumbnail images to the video processor device, the remote server device then delivers additional thumbnail images representing increasing time-resolution detail to the video processor device.

8. The system of claim 7 further comprising the video processor device, wherein the video processor device is configured to:

play the video content;

provide a cursor associated with a relative time position of the video content;

receive a new cursor position associated with a request for a new relative time position of the video content;

in response to receiving the new cursor position, display a thumbnail image that corresponds to the new relative time position; and transition the thumbnail image to a full display image at the new relative time position.

9. The system of claim 8, wherein the video processor device is further configured to resume playing of the video content from the new relative time position.

10. The system of claim 8, wherein the video processor device is further configured to pause the video content in response to the request for a new relative time position to form paused video content.

11. The system of claim 8, wherein the video processor device is further configured to display the paused video content in a reduced resolution format.

12. The system of claim 8, wherein the video processor device is further configured to visually emphasize the thumbnail image using a higher brightness relative to the paused video content.

13. A system comprising:

a first non-transitory computer-readable medium including executable instructions configured to cause a remote server device to:

receive, from a video processor device, a request for video content;

obtain reduced-resolution thumbnail images corresponding to relative time positions of the requested video content; and deliver the thumbnail images and also the requested video content to the video processor device to facilitate the video processor device's use of the thumbnail images to locate desired content within the requested video content, wherein the remote server device delivers, to the video processor device, the thumbnail images independently of the requested video content, and wherein, when the remote server device delivers the thumbnail images to the video processor device, the remote server device first delivers broadly-time-spaced thumbnail images to the video processor device, and after delivering the broadly-time-spaced thumbnail images to the video processor device, the remote server device then delivers additional thumbnail images representing increasing time-resolution detail to the video processor device.

14. The system of claim 13, further comprising a second non-transitory computer-readable medium including executable instructions configured to cause the video processor device to:

play the video content;

provide a cursor associated with a relative time position of the video content;

receive a new cursor position associated with a request for a new relative time position of the video content;

in response to receiving the new cursor position, display a thumbnail image that corresponds to the new relative time position; and transition the thumbnail image to a full display image at the new relative time position.

\* \* \* \* \*